Patented May 13, 1924.

1,494,147

UNITED STATES PATENT OFFICE.

FRANK BRAUN, OF BROOKLYN, NEW YORK.

DETERGENT.

No Drawing.   Application filed June 15, 1923.   Serial No. 645,639.

*To all whom it may concern:*

Be it known that I, FRANK BRAUN, citizen of the United States, residing at Brooklyn, in the county of Kings and State of New York, have invented certain new and useful Improvements in Detergents, of which the following is a specification.

The present invention relates to a detergent liquid which is particularly adapted for rapid cleaning and polishing glass, porcelain and glazed ceramic ware generally, and has for its object the provision of a liquid which is capable of rapidly and thoroughly cleaning and polishing materials of the character specified.

In order to describe the invention specifically, the following example is given, but it is to be understood that this example is given merely for the purpose of illustration and not as restricting the invention thereto. In preparing one gallon of the liquid, I mix together 40 ounces of alcohol, which may be ordinary ethyl alcohol or denatured alcohol, and 4 ounces of glycerin to form a liquid hereinafter referred to as "liquid A". I also mix together 60 ounces of a 5 per cent solution of citric acid in water, preferably distilled water, and 24 ounces of dilute acetic acid or vinegar. If dilute acetic acid is to be employed, it is preferable to use the same at a strength corresponding approximately to the acidity of ordinary vinegar. This constitutes "liquid B". I then mix together "liquid A" and "liquid B", made in the proportions above stated, which mixture constitututes the detergent solution.

The alcohol, as above stated, may be grain alcohol or denatured alcohol, grain alcohol being preferred when the same is readily procurable, since many of the denaturants commonly used are found to be somewhat injurious to the efficiency of the product. The citric acid should, of course, be pure or substantially pure, and this should preferably be dissolved in distilled water. Acetic acid is preferable to ordinary vinegar and if vinegar is to be employed, white vinegar is preferred.

The liquid can be applied to the glass or ceramic material in a variety of ways, but I find that the best mode is to spray the solution on the glass, only a few drops being sufficient. After spraying, the glass is rubbed well with a clean cloth or wiper, and can be then further rubbed slightly to produce a good gloss or finish. For cleaning lenses, either of eye glasses or telescopes or microscopes, etc., the liquid may be employed in the same manner. Great advantage of the product is that rain or dust does not readily settle on the glass, for example, windows cleaned with this material, and hence windows or other glass articles so cleaned will remain clean for a longer period than when other cleaning liquids are employed. A further advantage resides in the fact that the liquid can be applied during the hottest weather, even under most adverse conditions, such for instance, as when being subjected to most intense sunshine. Many of the cleaners heretofore employed do not give satisfactory results when used on glass on which the sun is shining. A further advantage resides in the fact that the liquid does not freeze, and can be used in winter equally as well as in summer.

In cleaning glass and similar articles only a few drops of the solution need be applied, and hence the liquid is economical to use.

What is claimed and desired to be secured by Letters Patent is:

1. A solution for cleaning and polishing glass and glazed ceramic ware which consists of alcohol, glycerin, water, citric acid and acetic acid.

2. A solution for cleaning and polishing glass and ceramic ware consisting of about 40 volumes of ethyl alcohol, 4 volumes of glycerin, 60 volumes of a 5 per cent solution of citric acid and 24 volumes of diluted acetic acid.

3. A solution for cleaning and polishing glass and ceramic ware, which consists of relatively large amounts of water and alcohol, together with relatively smaller amounts of glycerin, citric acid and acetic acid.

In testimony whereof I affix my signature.

FRANK BRAUN.